Patented Nov. 11, 1930

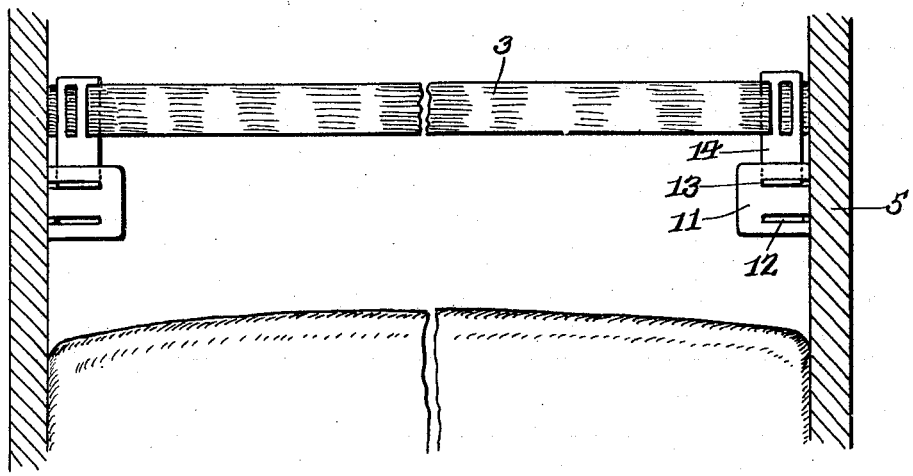
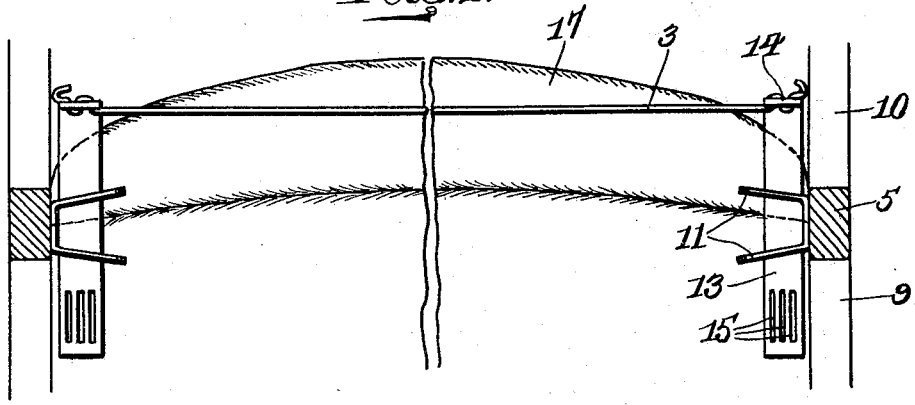
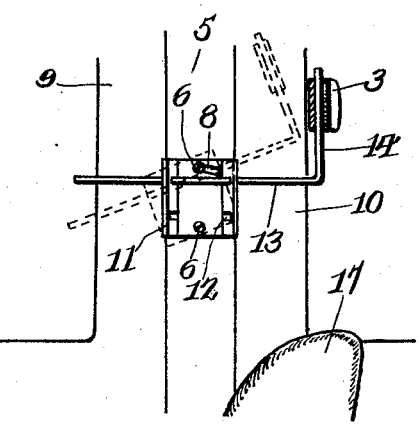
INVENTOR.
Sverre Quisling
BY
Geo. P. Kimmel
ATTORNEY.

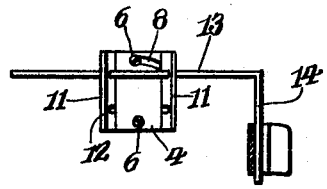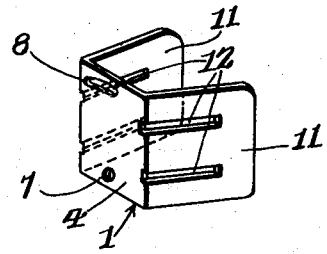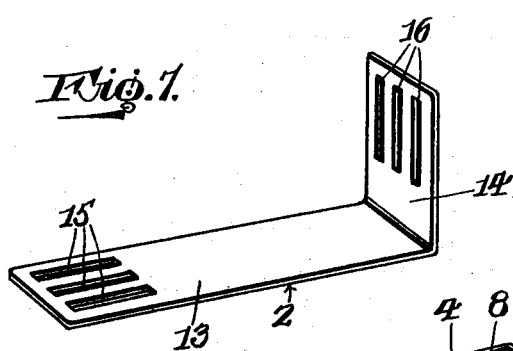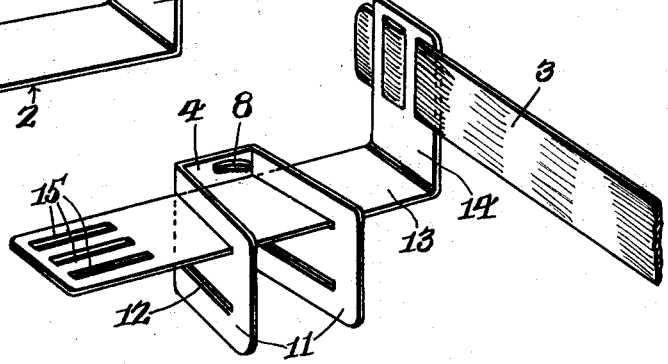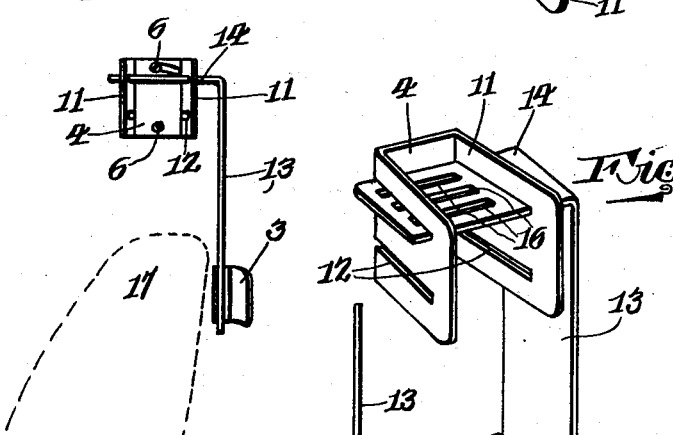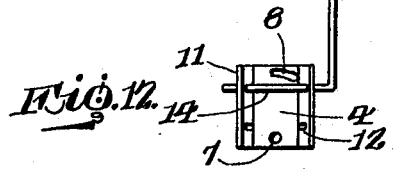

1,781,600

UNITED STATES PATENT OFFICE

SVERRE QUISLING, OF MADISON, WISCONSIN

COMBINED AUTOMOBILE HEADREST AND STRAP HANGER

Application filed March 19, 1930. Serial No. 437,227.

This invention relates to a combined automobile head rest and strap hanger and has for its primary object to provide, in a manner as hereinafter set forth, a device of such character which may be utilized as a support for the head of an occupant of an automobile, or as a support for robes, blankets, and the like, as desired.

A further object of the invention is to provide a device of the character aforesaid which may be adjusted vertically and horizontally in order that the same may be adapted for use in connection with automobile seats of different types, and further in order that the supporting element for the head of the user may be properly positioned in accordance with the height of the user.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:

Figure 1 is a front elevation of an embodiment of my invention, showing the same in association with the body of an automobile.

Figure 2 is a top plan thereof.

Figure 3 is a side elevation thereof.

Figure 4 is a detailed view showing a different manner of assembling one of the brackets and angular supports.

Figure 5 is a detailed view showing a still different manner of assembly between one of the brackets and angular supports.

Figure 6 is an enlarged perspective view of one of the brackets.

Figure 7 is an enlarged perspective view of one of the angular supports.

Figure 8 is an enlarged perspective view of one of the brackets and angular supports assembled in the manner illustrated in Figures 1, 2 and 3.

Figure 9 is a detailed view showing a still different manner of assembly between one of the brackets and angular support.

Figure 10 is an enlarged perspective view of one of the brackets and angular supports assembled in the manner illustrated in Figure 9.

Figure 11 is a sectional elevation illustrating the connection between one of the angular supports and the flexible head supporting element.

Figure 12 is a detailed view showing a still different manner of assembly between one of the brackets and angular supports.

A combined automobile head rest and strap hanger in accordance with this invention consists of a pair of brackets 1, each having an angular support 2 adjustably connected therewith, and a flexible element 3, such as a strap, adjustably connected with and extending between the angular support 2. Each bracket 1 is substantially U-shaped having its central or web portion 4 connected with a supporting member 5 by means of a pair of holdfast devices 6 respectively extending through a circular opening 7 and an elongated slot 8 formed in the web 4 of the bracket.

In the embodiment illustrated, the support 5 represents the pawl member between the front and rear doors 9 and 10 of an automobile body of the closed type, but it is to be understood that the support 5 may represent a supporting member suitably secured to the frame of an automobile body of the open type. Each of the brackets 1 further includes a pair of legs 11 formed integrally with and diverging from the web 4, each of the legs 11 being formed with a pair of spaced, lengthwise extending slots 12.

Each of the angular supports 2 consists of a long arm 13 and a short arm 14, respectively provided with spaced, lengthwise extending slots 15 and 16. In Figures 1, 2, 3 and 8, the long arms 13 of the angular supports 2 are shown extended from the rear through the uppermost of the slots 12 in the legs 11 of the brackets 1, and with the short arm 14 extending upwardly from the long arm 13. Connected with the short arms 14 is the strap 3, end portions of which are threaded through the slots 16 in the short arms 14 whereby the portion of the strap 3 between the angular supports 2 provides a flexible head rest for the occupants of the seat 17.

In Figure 4, the long arm 13 of the angular support 2 is shown extended through the uppermost slot 12 of the legs 11 of the bracket 1 from the front, and with the short arm 14 of the angular support 2 extending upwardly from the forward end of the long arm 13. In Figure 5 the long arm 13 is shown extended through the uppermost slot 12 of the bracket from the rear, and with the short arm 14 extending downwardly from the rearward end of the long arm 13. In Figures 9 and 10 the short arm 14 is extended through the uppermost slot 12 in the bracket 1 from the rear, and the long arm 13 is shown extending downwardly from the rearward end of the short arm 14. This position provides for the support of the flexible member 3 at the maximum distance below the bracket 1 and is preferably used when it is desired to support a blanket or the like on the flexible member 3. In Figure 12 the short arm 14 is shown extended through the uppermost slot 12 from the rear, and with the long arm 13 extending upwardly from the rearward end of the short arm 14. In this position the flexible element 3 is supported a maximum distance above the bracket 1 and may be advantageously used when the occupant of the seat 17 is exceedingly tall.

When assembled as in Figures 3 and 4 respectively the angular supports 2 may be adjusted with respect to the brackets 1 to position the supporting element 3 at the maximum distances rearwardly and forwardly respectively of the brackets 1. In each of the illustrations showing the different modes of assembly between the brackets 1 and angular supports 2, one of the arms of the angular supports may be inserted through the lowermost slot 12 in the legs 11 of the brackets in order to lower the position of the flexible element 3. Owing to the elongated slot 8 in the web 4 of each bracket, the angular supports and flexible member may be tilted forward as indicated in dotted lines in Figure 3, in order that the device may be prevented from obstructing the entrance into the rear compartment of the body of the vehicle. The slot 8 in each web 4 is arranged with the forward ends thereof in vertical alignment with the opening 7 and extends rearwardly in a slight downward arc.

It is thought that the many advantages of a combined automobile head rest and strap hanger in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. A device of the character described comprising, a pair of brackets adapted to be anchored to opposite sides of an automobile body, said brackets having inwardly extending leg portions, the leg portions of each bracket having horizontally aligned pairs of slots extending lengthwise of the leg portions, a pair of supports having angularly disposed portions of unequal length for selective insertion through selected aligned slots of the leg portions, and a flexible supporting element for selective detachable connection with the angularly disposed portions of each support.

2. A device of the character described comprising, a pair of brackets adapted to be anchored to opposite sides of an automobile body, said brackets having inwardly extending leg portions formed with lengthwise extending slots, a pair of supports having angularly disposed portions of unequal length for selective insertion through said slots, each of said angularly disposed portions having a series of lengthwise extending slots, and a flexible supporting element for selective interwoven engagement with the lengthwise extending slots of each of the angularly disposed portions of the supporting brackets.

3. A device of the character described comprising, a pair of brackets having web portions adapted to be tiltably anchored with respect to an automobile body at opposite sides of the latter, each of said brackets further having leg portions extending inwardly from the web portions and formed with lengthwise extending slots, a pair of supports having angularly disposed portions of unequal length for selective insertion through said slots, and a flexible supporting element for selective detachable connection with the angularly disposed portions of said supports.

In testimony whereof, I affix my signature hereto.

SVERRE QUISLING.